(12) United States Patent
Schroeder

(10) Patent No.: US 6,604,895 B1
(45) Date of Patent: Aug. 12, 2003

(54) AIRCRAFT PANEL DETAB ROUTER

(75) Inventor: Monte L. Schroeder, Buckley, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/029,633

(22) Filed: Oct. 24, 2001

(51) Int. Cl.$^7$ .................................................. B23C 1/20
(52) U.S. Cl. .................. 409/132; 409/178; 409/138; 409/137; 409/218; 144/371; 144/136.95; 144/253.3
(58) Field of Search ..................... 409/178, 179, 409/138, 180, 182, 137, 131–132, 218; 144/371, 154.5, 136.95, 253.3; 451/358; 83/745; 30/372; 269/6

(56) References Cited

U.S. PATENT DOCUMENTS

| | | | | |
|---|---|---|---|---|
| 2,014,229 A | * | 9/1935 | Emmons | 83/170 |
| 2,605,791 A | * | 8/1952 | Zern | 144/27 |
| 2,921,492 A | * | 1/1960 | Worth | 409/178 |
| 3,010,352 A | * | 11/1961 | Dunlap | 409/138 |
| 3,259,021 A | * | 7/1966 | Appleton et al. | 409/178 |
| 3,476,161 A | * | 11/1969 | Dunlap | 409/178 |
| 3,501,999 A | * | 3/1970 | Parks | 409/182 |
| 4,033,230 A |   | 7/1977 | Onsrud | |
| 4,489,634 A | * | 12/1984 | Volk | 83/522.28 |
| 4,599,018 A | * | 7/1986 | Woods | 409/178 |
| 4,614,466 A | * | 9/1986 | Snyder | 409/179 |
| 4,850,763 A | * | 7/1989 | Jack et al. | 409/178 |
| 5,004,385 A | * | 4/1991 | Kishi | 409/180 |
| 5,403,133 A | * | 4/1995 | Kim | 409/178 |
| 5,423,642 A | * | 6/1995 | Heck | 409/138 |
| 5,662,440 A | * | 9/1997 | Kikuchi et al. | 409/182 |
| 5,709,372 A | * | 1/1998 | Lii | 269/6 |
| 5,848,930 A | * | 12/1998 | Jones | 409/138 |
| 5,853,168 A | * | 12/1998 | Drake | 269/6 |
| 5,988,241 A | * | 11/1999 | Bosten et al. | 144/154.5 |
| 6,042,311 A | * | 3/2000 | Yokoyama et al. | 409/138 |
| 6,302,625 B1 | * | 10/2001 | Carey et al. | 409/132 |
| 6,467,385 B1 | * | 10/2002 | Buttrick et al. | 83/745 |
| 2002/0168241 A1 | * | 11/2002 | David et al. | 409/178 |

* cited by examiner

*Primary Examiner*—A. L. Wellington
*Assistant Examiner*—Erica E Cadugan
(74) *Attorney, Agent, or Firm*—DiPinto & Shimokaji, PC

(57) ABSTRACT

The aircraft panel detab router to trim tabs from airframe parts such as wing elements, panels and airframe skin structures includes a tool fixture having a clamping mechanism for securing to a panel edge. The tool fixture includes a linear slide to which a sliding assembly is slidably engaged. The sliding assembly includes an eccentric cam ring mount for retaining and position adjustment of a router relative to the panel edge. The router has a cutting tool attached which cutting tool at its distal end is also supported by a support arm attached to the sliding assembly. A vacuum manifold is also attached to the sliding assembly to remove debris created by the trimming action of the cutter tool.

19 Claims, 7 Drawing Sheets

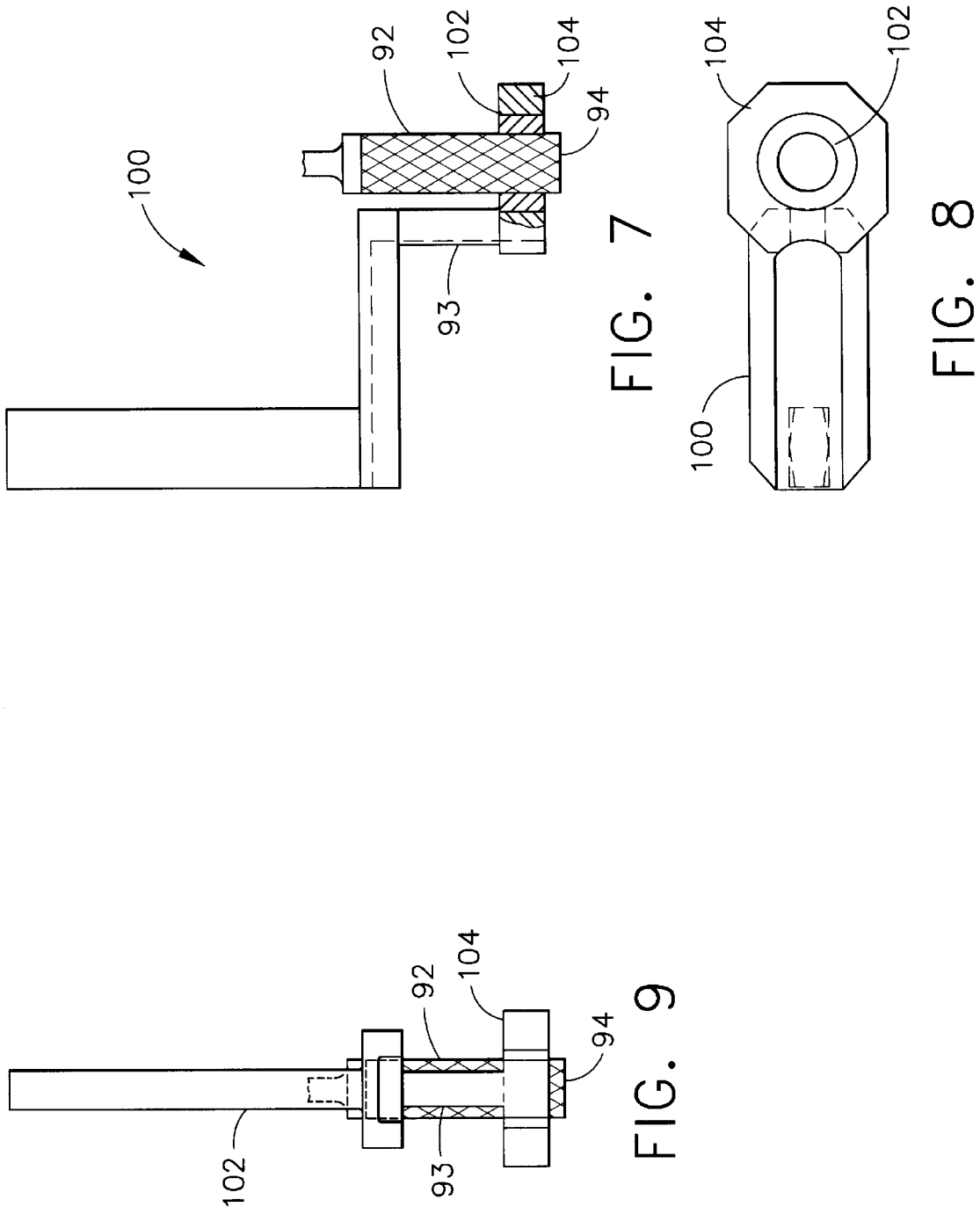

AIRCRAFT PANEL DETAB ROUTER

BACKGROUND OF THE INVENTION

This invention relates to rotary cutters or routers that are used to trim or cut metal protrusions from aircraft airframe parts such as wing elements, panels and the like. The new router apparatus allows one operator to secure the apparatus in position for trimming and to perform the trimming without assistance of others.

Rotary cutters or hand held routers are currently used to trim or cut protruding metal from the surface and edges of aircraft structural elements. Tabs, rivets and the like often protrude or extend above what is intended to be a finish surface or edge after assembly of aircraft metal structural elements. A hand held router with a rotary burr cutter tool is often used to trim any such irregular metal protrusions. The problem with hand use is that an uneven finishing may be caused by the difficulty in holding the router due to torsional forces created in trimming. Also, a second person may be required to vacuum dust created during the trimming operation.

Currently used methods for trimming tabs from aircraft panel edges use a router fence guide that is clamped onto a wing metal skin at an edge using removable index pins for positioning. An air motor router with a nose bushing resting on the router fence guide is moved along the wing edge to trim protruding tabs. A second operator positions a vacuum dust collection hose during the trimming to collect cuttings. This method is noisy due partially to the rotary file burr cutter tool spring back against the force of the operator caused by the torsional forces created. Also, the cutting tool vibrates, bounces and chatters creating an uneven finish and causing early cutting tool failure.

The problems created when a rotary cutter or router supports only one end of a cutting tool have been addressed in design of cutting machines. In cases where significant force may be created by the cutting or trimming operation both ends of the cutting tool may be supported to reduce spring back or bouncing of an unsupported cutting tool end. An example of such an apparatus is disclosed in U.S. Pat. No. 4,033,230. In this instance the cutter is supported at both ends by an upper and lower collet or chuck. This particular solution does not lend itself to the small hand held rotary cutter, which must be portable and easily positioned at the work site.

As can be seen, there is a need for a simple, portable router apparatus that is controlled in movement by a cutting guide apparatus and that has a supported cutting tool.

SUMMARY OF THE INVENTION

An improved aircraft panel detab router according to the present invention comprises a tool fixture for clamping to an airframe metal skin edge, a router with cutting tool movably attached to the tool fixture and a vacuum manifold debris collection assembly.

In one aspect of the present invention a panel detab router comprises a tool fixture having a linear slide and a plurality of edge guide pin locators for positioning on a metal panel edge. A clamping mechanism is attached to the tool fixture to retain it on the metal panel. A sliding assembly having a router with a cutter tool is slidably engaged with the linear slide for movement parallel to the metal panel edge with the cutter tool along the edge thereof. A support arm is attached to the sliding assembly extending parallel with the cutter tool and having a tool bearing therein for engagement with a distal end of the cutter tool.

In another aspect of the invention the router is attached to an adjustable eccentric cam ring mount for mounting and vertical positioning of the router for cutting. The cam ring mount may be releasably locked by a cam lever.

In yet another aspect of the invention the clamping mechanism comprises a clamp arm attached to a clamp rod and the clamp rod is slidably engaged with a clamp trigger retract mechanism having a release trigger. The clamp trigger retract mechanism is attached to a clamp support mount. The clamp support rod has a clamp return spring thereon which is positioned between the clamp arm and the clamp support mount. When the release trigger is activated the clamp return spring applies force to disengage the clamp arm. The clamp support mount is attached to the tool fixture. Also a vacuum manifold is attached to the sliding assembly to collect debris from the trimming.

In a further aspect of the present invention a method for trimming protruding tabs from panel edges involves the steps of positioning the tool fixture at a panel edge and clamping it thereto, adjusting the eccentric cam ring mount of the sliding assembly to position the router and cutter tool; powering the router and sliding the sliding assembly along the linear slide of the tool fixture to trim protruding tabs; and vacuuming debris produced by the trimming.

These and other features, aspects and advantages of the present invention will become better understood with reference to the following drawings, description and claims.

BRIEF DESCRIPTION OF THE DRAWINGS

FIG. 7 illustrates a top view of the support arm according to an embodiment of the invention;

FIG. 8 illustrates a front elevation view of the support arm according to an embodiment of the invention;

FIG. 9 illustrated a side view of the support arm according to an embodiment of the invention.

DETAILED DESCRIPTION OF THE INVENTION

Figure 1:
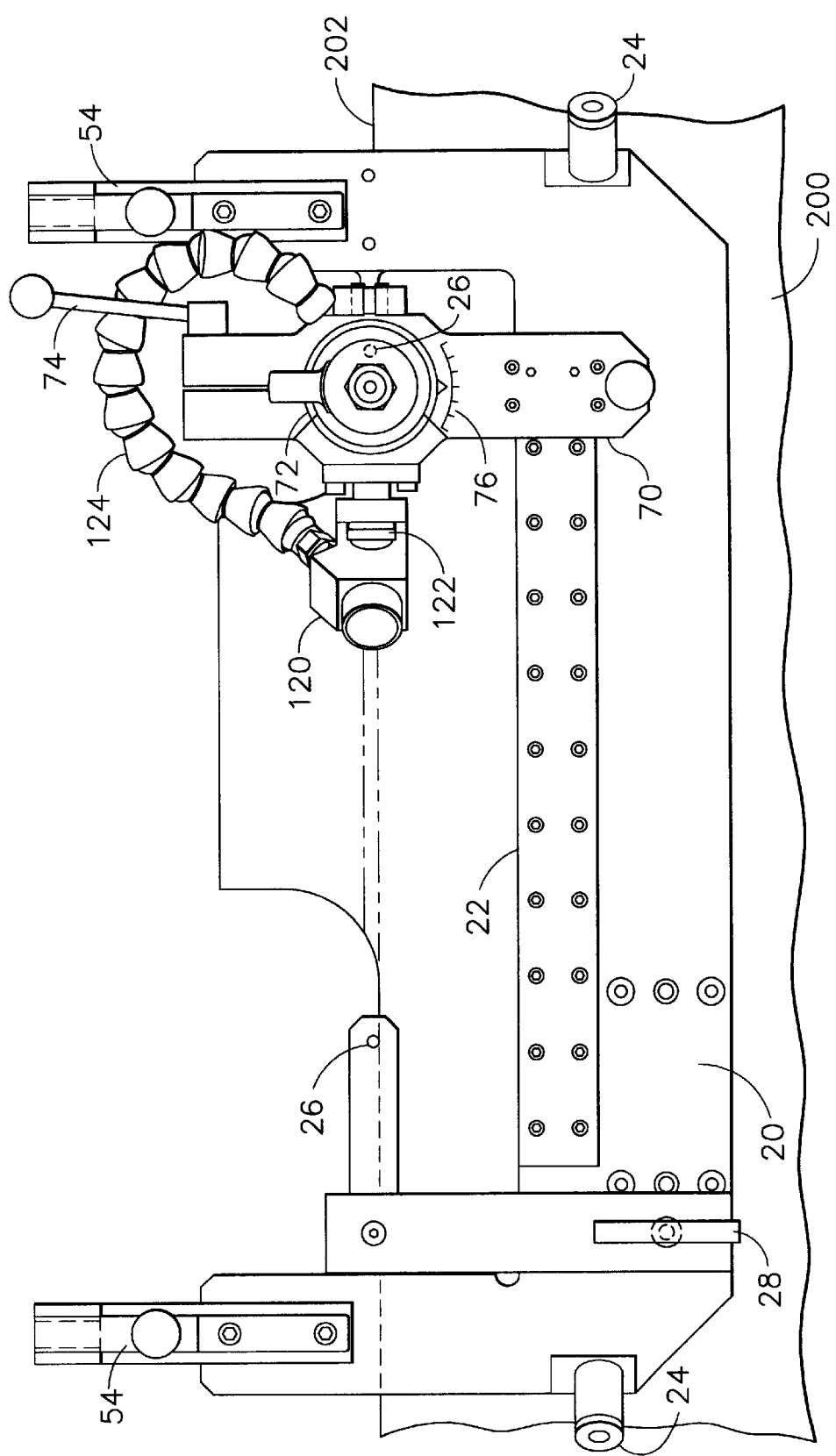
FIG. 1 illustrates a front elevation view according to an embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Referring to FIGS. 1 through 3 and 6, an aircraft panel detab router 10 may be used to trim or cut protruding material such as tabs from the edges of aircraft airframe parts such as wing elements, panels and the like. Aircraft panel detab router 10 has a tool fixture 20 with clamping mechanism 50 for attachment to an aircraft metal skin or panel edge 200. A rotary cutter or router 90 may be attached to a sliding assembly 70, which may be slidably mounted on a linear slide 22 of the tool fixture 20. There may also be a vacuum manifold 120 attached to the sliding assembly 70. The detab router 10 is illustrated as clamped to the top edge of a metal panel 200 by clamping mechanism 50.

In use the detab router 10 may be positioned on a panel 200 by an operator using lift handles 24 and edge guide pin locators 26 in combination with edge locator assembly 28. The clamp arms 52 may then be secured using the clamp trigger retract mechanism 54. A release trigger 56 may be provided for ease in unclamping and removal of the tool fixture 20.

Figure 4:
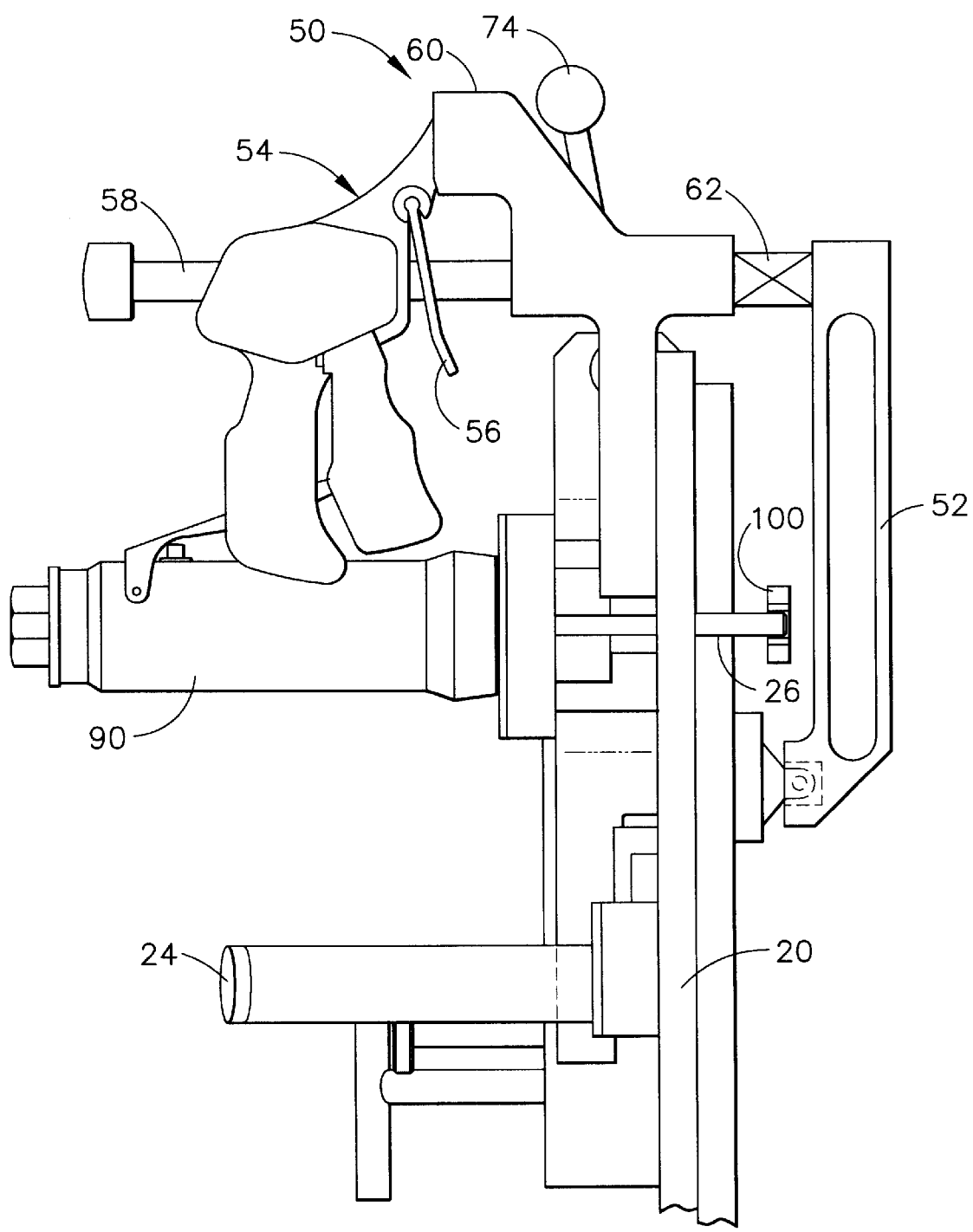
FIG. 4 illustrates a partial side elevation view of the detab router according to an embodiment of the invention.

Referring to FIG. 4, the clamping mechanism 50 may have clamp arm 52 on clamp rod 58 that may be engaged with clamp trigger retract mechanism 54 to clamp the tool fixture 20 to panel 200. These elements may be attached to the tool fixture by clamp support mount 60. A clamp return spring 62 may aid in release of the clamps 52 when release trigger 56 is activated.

Figure 3:
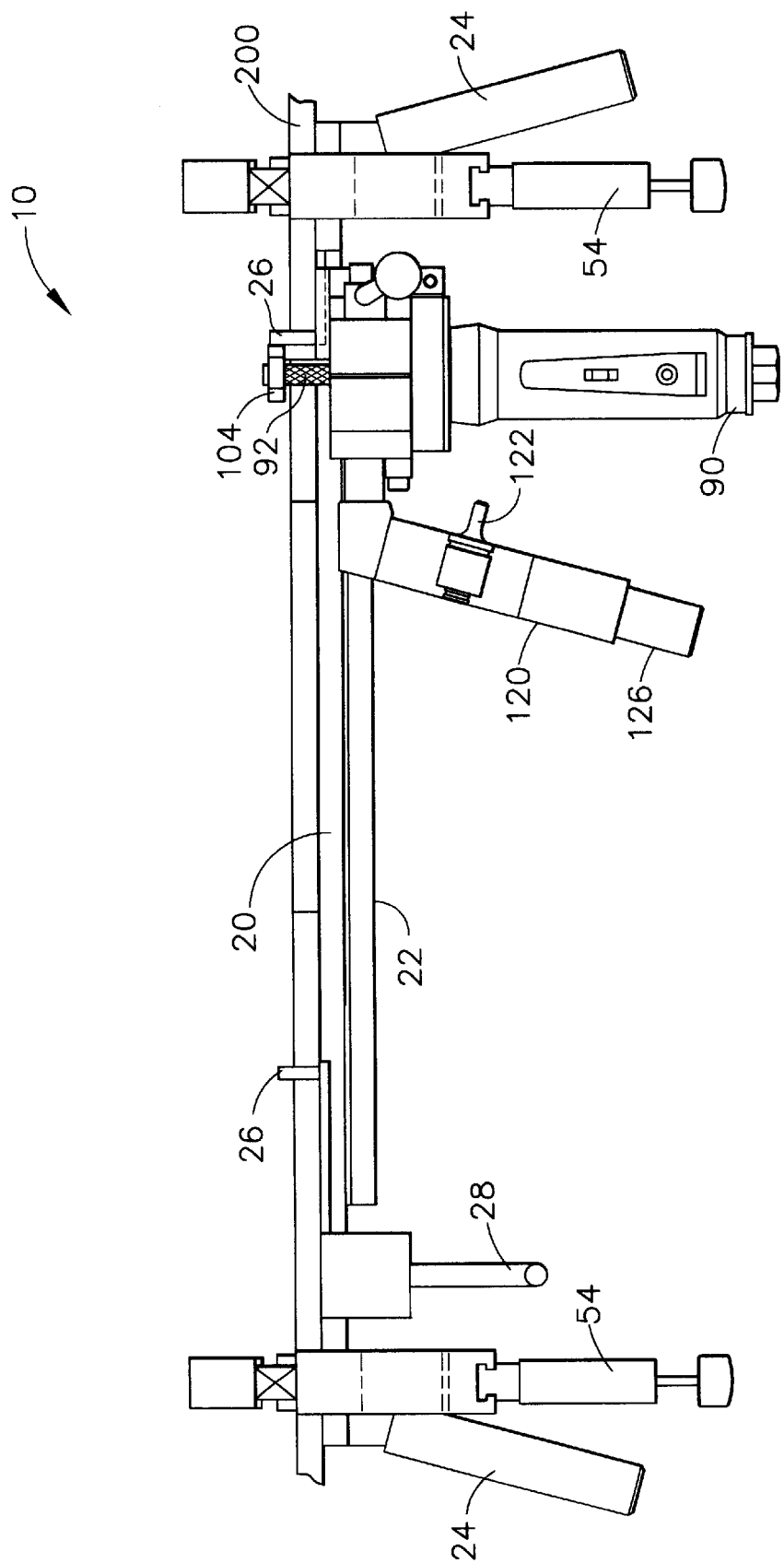
FIG. 3 illustrates a top view according to an embodiment of the invention.
Figure 5:
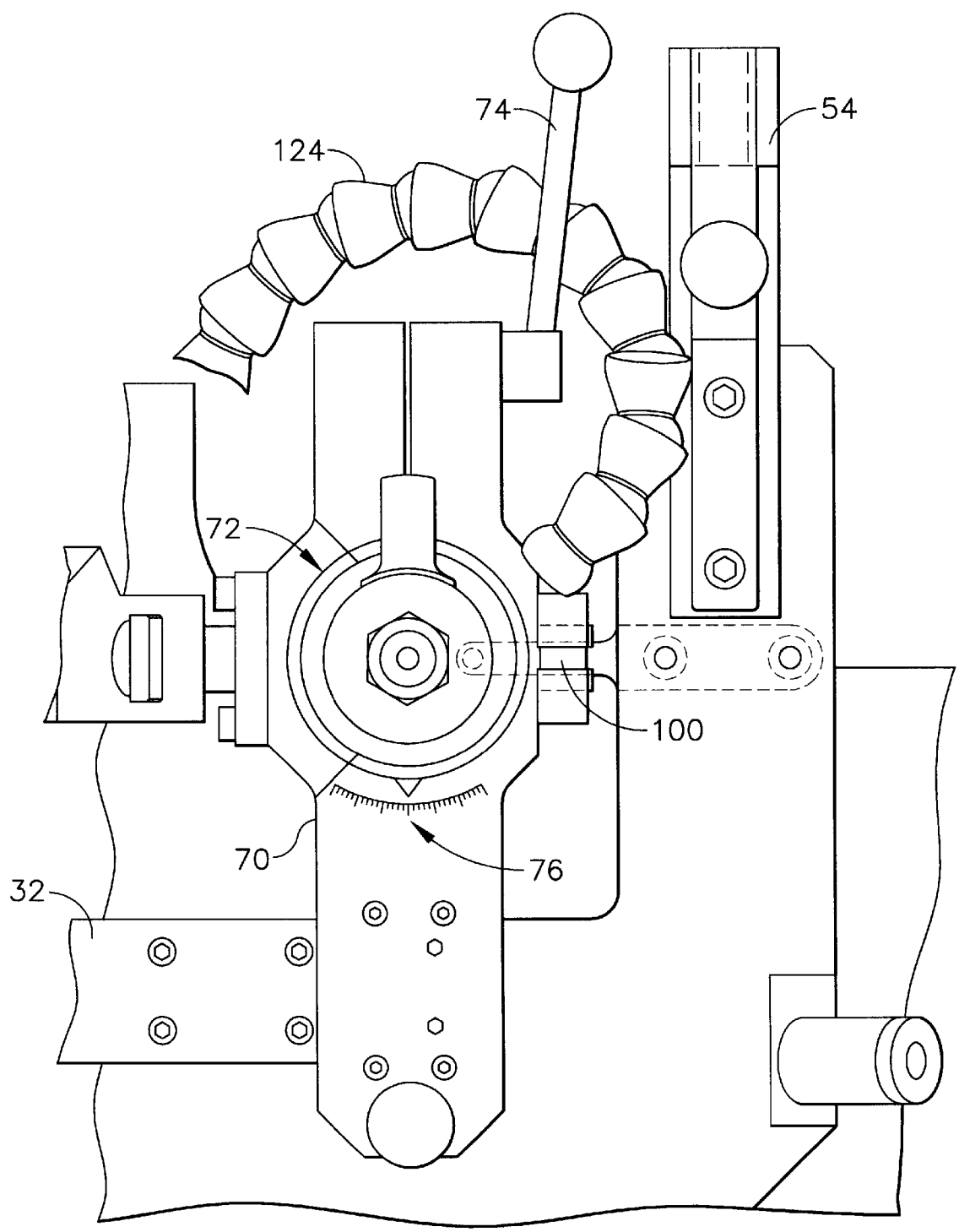
FIG. 5 illustrates a partial front view of the sliding assembly and eccentric cam ring mount according to an embodiment of the invention.
Figure 6:
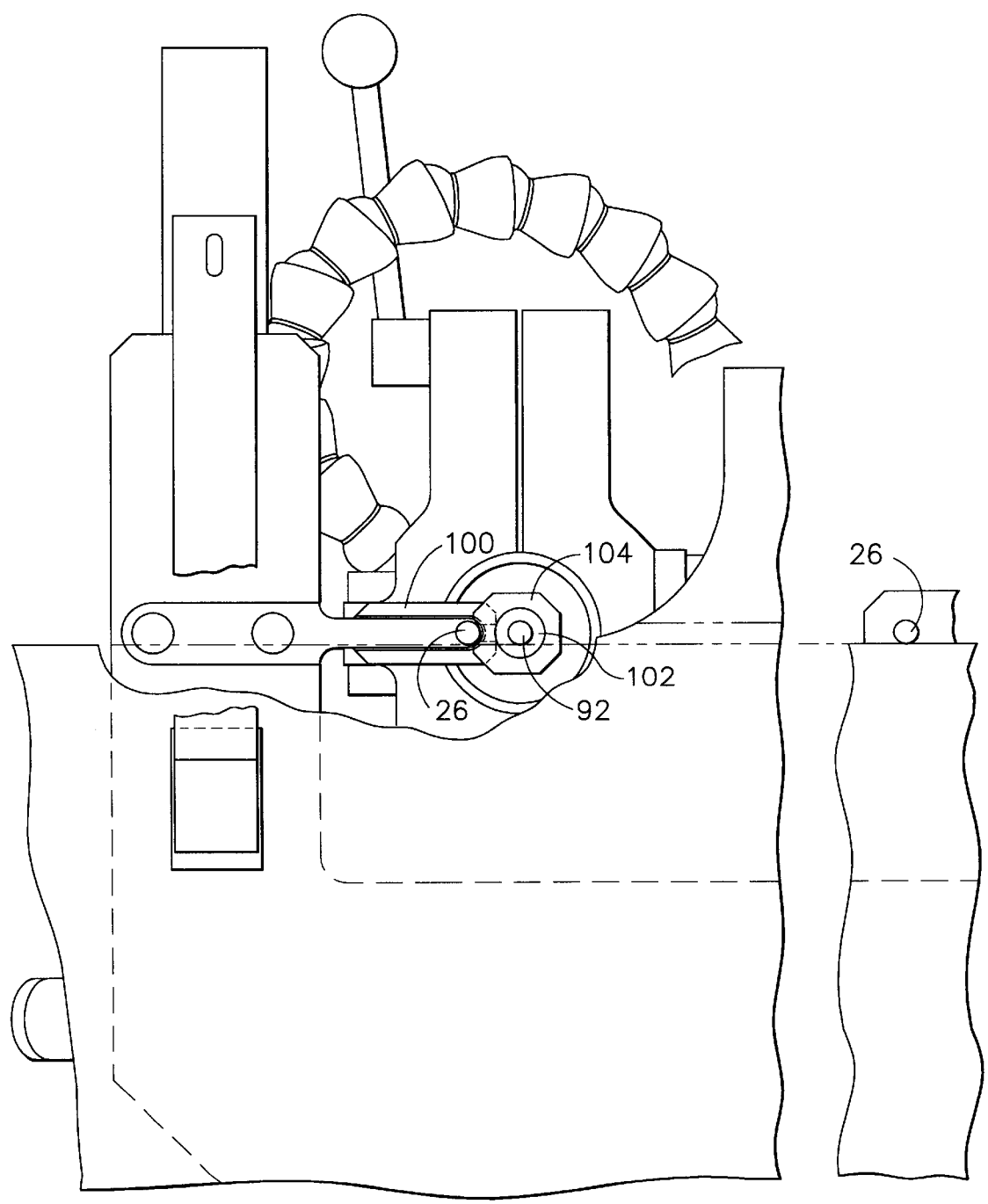
FIG. 6 illustrates a partial back view of the sliding assembly and eccentric cam ring mount according to an embodiment of the invention.

Referring to FIGS. 1, 3 and 5, once the tool fixture 20 is positioned and secured the router 90 may be more precisely positioned in the vertical or Z axis to properly locate the cutter tool 92 for trimming the panel 200 edge 202 of tabs or burrs protruding therefrom. A vertical scale 76 may be used to aid in vertical positioning. The sliding assembly 70 may have an eccentric cam ring mount 72 that when rotated moves the router 90 up or down. Once the router 90 is properly positioned a cam lever 74 is engaged to retain the ring mount 72. It has been found that a vertical accuracy of approximately 0.003 inch may be achieved.

Referring again to FIGS. 1 through 3 and 6, to trim or cut the panel 200 the sliding assembly 70 may be moved along the linear slide 22 thereby moving the rotating cutter tool 92 along the panel edge 202. To minimize cutter tool 92 vibration, bouncing or spring back caused by the rotational tortional forces of the cutter tool 92 rotary file burr trimming action, the cutter tool 92 may be supported at the cutter tool distal end 94 by a support arm 100 having a tool bearing 102 therein.

Referring to FIGS. 7 through 9, the support arm 100 may serve to stabilize the cutter tool 92 at its free or distal end 94. The support arm 100 may be attached to the sliding assembly (not shown) and extend therefrom parallel to and to one side of the cutter tool 92. The thickness of the support arm 100 parallel arm 93 may be less than the diameter of the cutter tool 92 to allow travel along the cut being made by the cutter tool 92. At the bearing end 104 of the support arm 100 there may be a 90 degree bend to place the bearing end 104 over the distal end 94 of the cutter tool 92. The bending load experienced by the cutting tool 92 may be balanced by the support arm 100. A standard cutter tool 92 may be used as the cutting flutes are in direct contact with the tool bearing 102 and thereby cause the tool bearing 102 to rotate.

Figure 2:
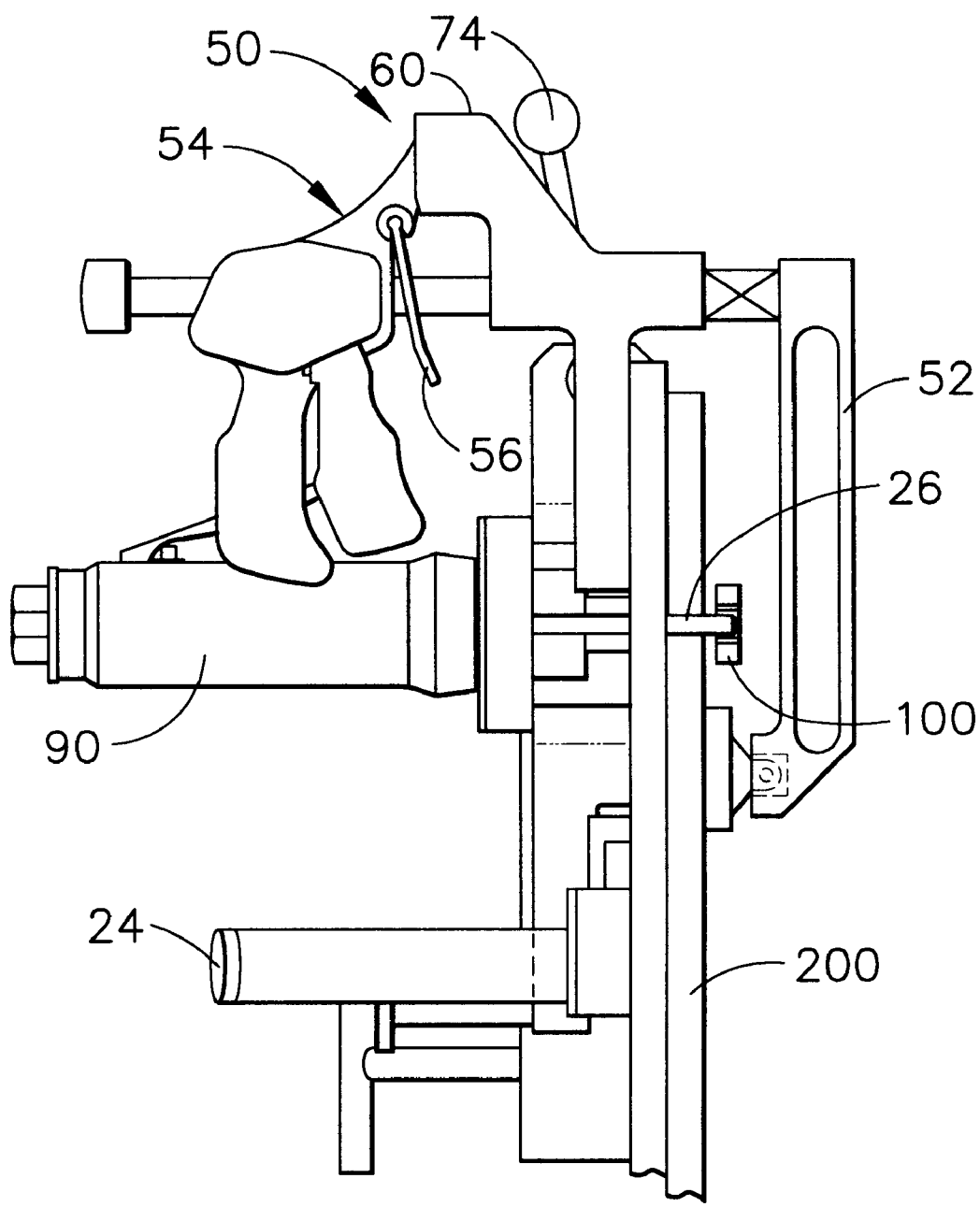
FIG. 2 illustrates a side elevation view according to an embodiment of the invention.

Referring to FIGS. 1 through 3, in operation it has been found that first setting the vertical adjustment of the router 90 for about a 0.015 inch rough cut of a panel edge 202 and then adjusting for about a 0.003 inch net trim finish cut may produce the best finishing with minimum noise and wear of the cutter tool 92. The support arm 100 traveling in alignment with the router 90 spindle center line or arbor support may reduce cutter spring back and chatter noise. As a result thereof the carbide cutting flutes of the cutter tool 92 may not wear as rapidly as with previous cutting methods. The controlled movement along the linear slide 22, as compared to previous hand held methods, may prevent damage to the panel 200 caused by cutting deeper into the panel edge 202 than is necessary to trim the tabs.

The vacuum manifold 120 may be positioned on the sliding assembly 70 for vacuum collection of debris created during a trimming process. It may have a vacuum metering valve 122 for rear suction to adjust vacuum collection flow. A vacuum hose 124 may be attached to the manifold neck 126 and attached at its opposite end to a vacuum source (not shown). The incorporation of the vacuum apparatus with the slide assembly 70 allows the detab router 10 to be operated by a single operator. Detab trimming equipment currently in use requires a second operator to position and operate a separate vacuum line.

It should be understood, of course, that the foregoing relates to preferred embodiments of the invention and that modifications may be made without departing from the spirit and scope of the invention as set forth in the following claims.

I claim:

1. An apparatus for trimming protruding metal tabs from metal panel edges comprising:
   a tool fixture having a linear slide and a plurality of edge guide pin locators;
   a clamping mechanism having a clamp support mount, a clamp trigger retract mechanism, and a clamp rod, said clamp rod slidably engaged with said clamp trigger retract mechanism; said clamp trigger retract mechanism attached to said clamp support mount and said clamp support mount attached to said tool fixture;
   a sliding assembly slidably engaged with said linear slide and having a cutter tool mounted in said sliding assembly oriented for positioning above one of the metal panel edges; and
   a support arm attached to said sliding assembly having a tool bearing therein for engagement with a distal end of said cutter tool.

2. The apparatus as in claim 1 wherein a router is attached to an adjustable eccentric cam ring mount for mounting in said sliding assembly, said eccentric cam ring mount oriented to adjust said router vertically with respect to said one of the metal panel edges.

3. The apparatus as in claim 2 wherein said eccentric cam ring mount is releasably locked by a cam lever.

4. The apparatus as in claim 1 wherein said tool fixture has a pair of lift handles.

5. An apparatus for trimming protruding metal tabs from metal panel edges comprising:
   a tool fixture having a linear slide and a plurality of edge guide pin locators;
   a clamping mechanism attached to said tool fixture, said clamping mechanism comprising:
      a clamp arm attached to a clamp rod and said clamp rod is slidably engaged with a clamp trigger retract mechanism; and
      said clamp trigger retract mechanism attached to a clamp support mount, said clamp rod slidably inserted through said clamp support mount and said clamp support mount attached to said tool fixture;
   a sliding assembly slidably engaged with said linear slide and having a cutter tool mounted in said sliding assembly oriented for positioning above one of the metal panel edges; and
   a support arm attached to said sliding assembly having a tool bearing therein for engagement with a distal end of said cutter tool.

6. The apparatus as in claim 5 wherein said clamping mechanism has a clamp return spring on said clamp rod positioned between said clamp arm and said clamp support mount, and a release trigger engaged with said clamp trigger retract mechanism.

7. The apparatus as in claim 1 wherein there is a vacuum manifold attached to said sliding assembly and said vacuum manifold is connected to a vacuum source.

8. An apparatus for trimming protruding tabs from panel edges comprising:
   a tool fixture having a linear slide and a plurality of edge guide pin locators;
   a clamping mechanism having a clamp support mount, a clamp trigger retract mechanism, and a clamp rod, said clamp rod slidably inserted through said clamp support mount and slidably engaged with said clamp trigger retract mechanism; said clamp trigger retract mechanism attached to said clamp support mount and said clamp support mount attached to said tool fixture;
   a sliding assembly slidably engaged with said linear slide;
   a router, having a cutter tool, attached to an adjustable eccentric cam ring mount that is mounted in said sliding assembly, said eccentric cam ring mount oriented to adjust said router vertically with respect to one of the panel edges, wherein said router is oriented for positioning above said one of the panel edges; and
   a support arm attached to said sliding assembly having a tool bearing therein for engagement with a distal end of said cutter tool.

9. The apparatus as in claim 8 wherein said eccentric cam ring mount is releasably locked by a cam lever.

10. The apparatus as in claim 8 wherein said tool fixture has a pair of lift handles.

11. An apparatus for trimming protruding tabs from panel edges comprising:
   a tool fixture having a linear slide and a plurality of edge guide pin locators;
   a clamping mechanism attached to said tool fixture, said clamping mechanism comprising:
      a clamp arm attached to a clamp rod and said clamp rod is slidably engaged with a clamp trigger retract mechanism; and
      said clamp trigger retract mechanism attached to a clamp support mount, said clamp rod slidably inserted through said clamp support mount and said clamp support mount attached to said tool fixture;
   a sliding assembly slidably engaged with said linear slide;
   a router, having a cutter tool, attached to an adjustable eccentric cam ring mount that is mounted in said sliding assembly, said eccentric cam ring mount oriented to adjust said router vertically with respect to one of the panel edges, wherein said router is oriented for positioning above said one of the panel edges; and
   a support arm attached to said sliding assembly having a tool bearing therein for engagement with a distal end of said cutter tool.

12. The apparatus as in claim 11 wherein said clamping mechanism has a clamp return spring on said clamp rod positioned between said clamp arm and said clamp support mount, and a release trigger engaged with said clamp trigger retract mechanism.

13. The apparatus as in claim 8 wherein there is a vacuum manifold attached to said sliding assembly and said vacuum manifold is connected to a vacuum source.

14. An apparatus for trimming protruding metal tabs from metal panel edges comprising:
   a tool fixture having a linear slide and a plurality of edge guide pin locators;
   a clamping mechanism attached to said tool fixture comprising: a clamp arm attached to a clamp rod and said clamp rod is slidably engaged with a clamp trigger retract mechanism having a release trigger; said clamp trigger retract mechanism attached to a clamp support mount; said clamp rod slidably inserted through said clamp support mount; a clamp return spring on said clamp rod positioned between said clamp arm and said clamp support mount; and said clamp support mount attached to said tool fixture;
   a sliding assembly slidably engaged with said linear slide;
   a router having a cutter tool attached to an adjustable eccentric cam ring mount that is mounted in said sliding assembly, said eccentric cam ring mount oriented to adjust said router vertically with respect to one of the metal panel edges and releasably locked by a cam rod, wherein said router is oriented for positioning above said one of the metal panel edges;
   a support arm attached to said sliding assembly having a bearing end with a tool bearing therein for engagement with a distal end of said cutter tool; and
   a vacuum manifold attached to said sliding assembly and said vacuum manifold is connected to a vacuum source by a flexible hose.

15. A method for trimming protruding tabs from panel edges, comprising the steps of:
   positioning a tool fixture at one of the panel edges using a pair of lift handle supports and a plurality of edge guide pin locators;
   clamping the tool fixture to said one of the panel edges with a pair of clamping mechanisms, at least one of said pair of clamping mechanisms having a clamp support mount attached to said tool fixture, a clamp trigger retract mechanism attached to said clamp support mount, and a clamp rod slidably engaged with said clamp trigger retract mechanism and slidably inserted through said clamp support mount;
   adjusting an eccentric cam ring mount on a sliding assembly slidably engaged with a linear slide on the tool fixture to position a router with a cutter tool that is located above said one of the metal panel edges and that is supported at a distal end by a support arm, said eccentric cam ring mount oriented to adjust said router vertically with respect to said one of the panel edges;
   locking the eccentric cam ring mount with a cam lever;
   powering the router to rotate the cutter tool adjacent said one of the panel edges and sliding the sliding assembly along the linear slide to trim the protruding tabs with the cutter tool; and
   vacuuming debris produced by the trimming of tabs with a vacuum manifold attached to a vacuum source.

16. An apparatus for trimming protruding tabs from a panel along a panel edge comprising:
   a tool fixture having a linear slide and a plurality of edge guide pin locators;
   a clamping mechanism having a clamp support mount attached to said tool fixture;
   a sliding assembly slidably engaged with said linear slide;
   a router having a cutter tool and mounted in said sliding assembly, wherein said router is oriented for positioning above said panel edge; and
   a support arm attached to said sliding assembly, said support arm having a tool bearing for engagement with a distal end of said cutter tool, said support arm having a parallel arm extending from said sliding assembly parallel to and to one side of said cutter tool, said parallel arm having a thickness less than a diameter of said cutter tool, and said support arm disposed to travel along a cut being made by said cutter tool between the panel and one of the protruding tabs, said cutter tool being supported on bet sides of the panel and both sides of said one of the protruding tabs.

17. The apparatus of claim 16 wherein said cutter tool is supported on a first side of the panel and a first side of said one of the protruding tabs by said router, and said cutter tool is supported on a second side of the panel and a second side of said one of the protruding tabs by said tool bearing.

18. A method for trimming protruding tabs from a panel along a panel edge, comprising the steps of:

positioning a tool fixture at the panel edges using a pair of lift handle supports and a plurality of edge guide pin locators;

clamping the tool fixture to the panel edge with a pair of clamping mechanisms, adjusting an eccentric cam ring mount on a sliding assembly, said sliding assembly slidably engaged with a linear slide on the tool fixture to position a router with a cutter tool that is located above the panel edge, said eccentric cam ring mount oriented to adjust said router vertically with respect to the panel edge;

supporting said cutter tool at a distal end by a support arm having a tool bearing therein for engagement with a distal end of said cutter tool, said support arm having a parallel arm extending from said sliding assembly parallel to and to one side of said cutter tool, said parallel arm having a thickness less than a diameter of said cutter tool, and said support arm disposed to travel along a cut being made by said cutter tool between said panel and one of the protruding tabs, said cutter tool being supported on both sides of the panel and both sides of said one of the protruding tabs;

locking the eccentric cam ring mount with a cam lever;

powering the router to rotate the cutter tool adjacent the panel edge and sliding the sliding assembly along the linear slide to trim the protruding tabs with the cutter tool; and vacuuming debris produced by the trimming of tabs with a vacuum manifold attached to a vacuum source.

19. The method of claim 18 wherein said supporting step further comprises supporting said cutter tool on a first side of the panel and a first side of said one of the protruding tabs by said router, and supporting said cutter tool on a second side of the panel and a second side of said one of the protruding tabs by said tool bearing.

* * * * *